M. SELLERS & H. M. NICHOLLS.
PROCESS OF BALLING SCRAP.
APPLICATION FILED NOV. 8, 1911.
1,029,235.
Patented June 11, 1912.
3 SHEETS—SHEET 1.
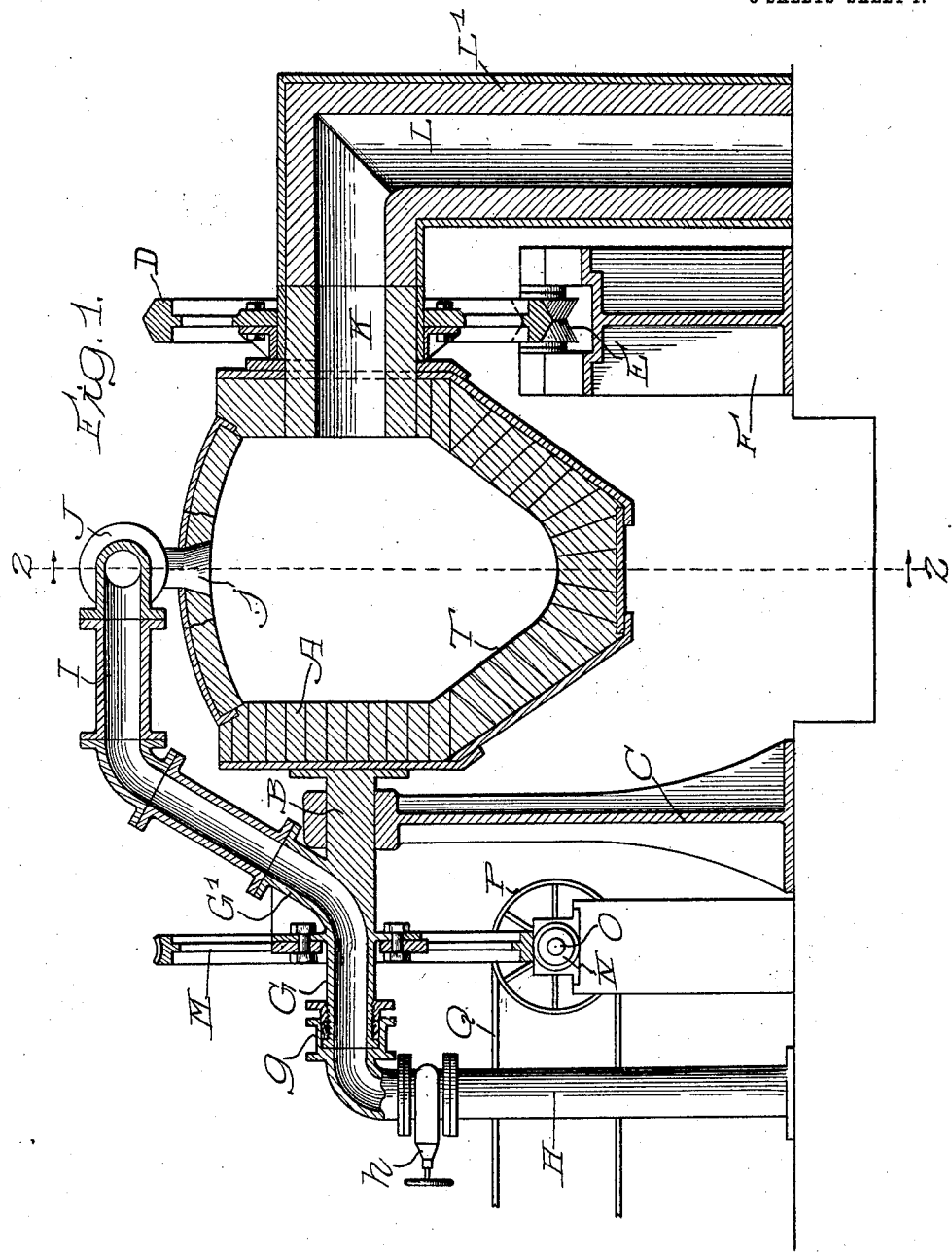

M. SELLERS & H. M. NICHOLLS.
PROCESS OF BALLING SCRAP.
APPLICATION FILED NOV. 8, 1911.
1,029,235.
Patented June 11, 1912.
3 SHEETS—SHEET 2.
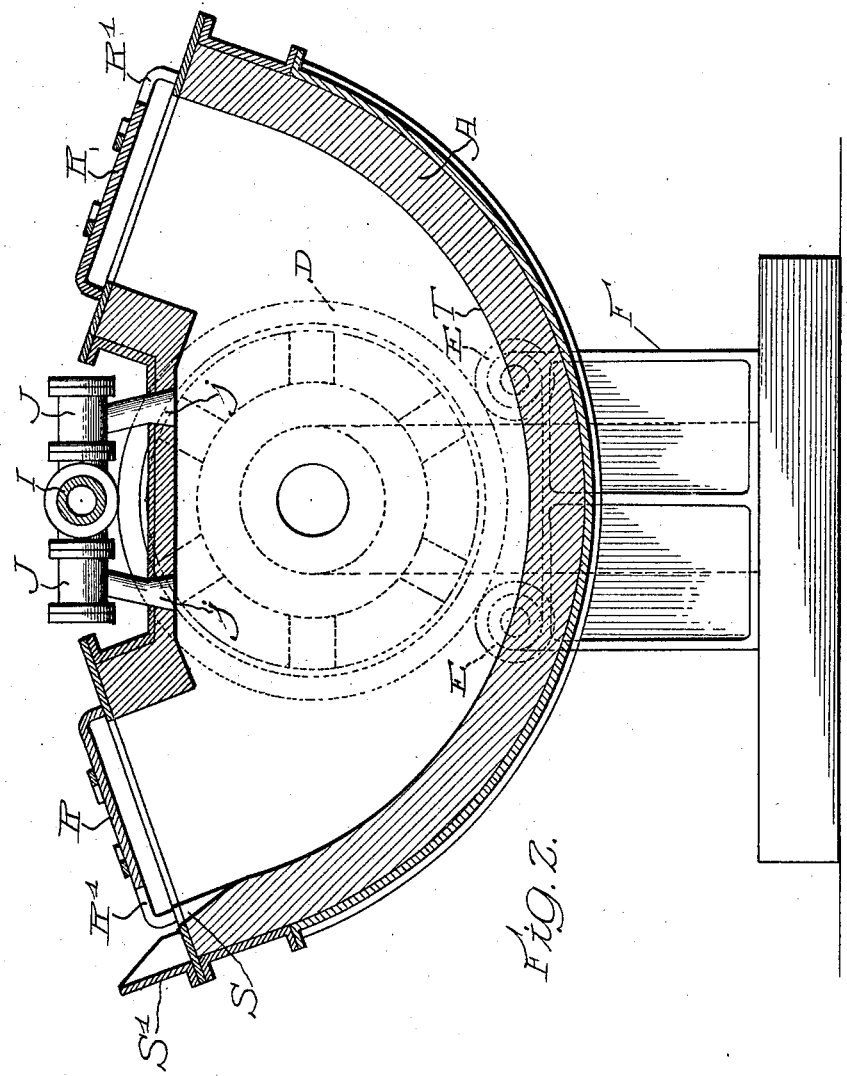

M. SELLERS & H. M. NICHOLLS.
PROCESS OF BALLING SCRAP.
APPLICATION FILED NOV. 8, 1911.
1,029,235.
Patented June 11, 1912.
3 SHEETS—SHEET 3.
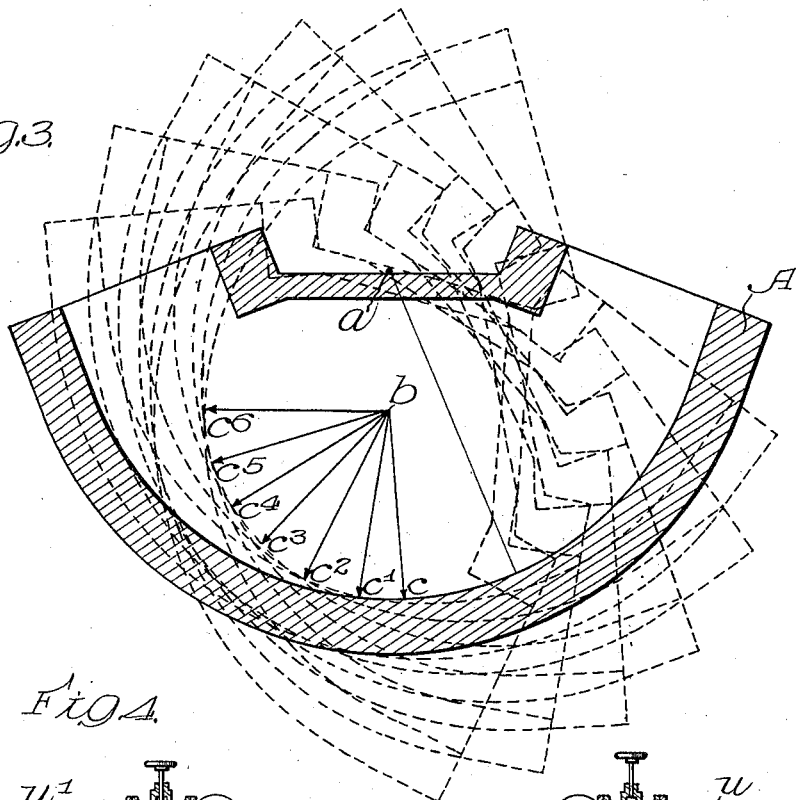
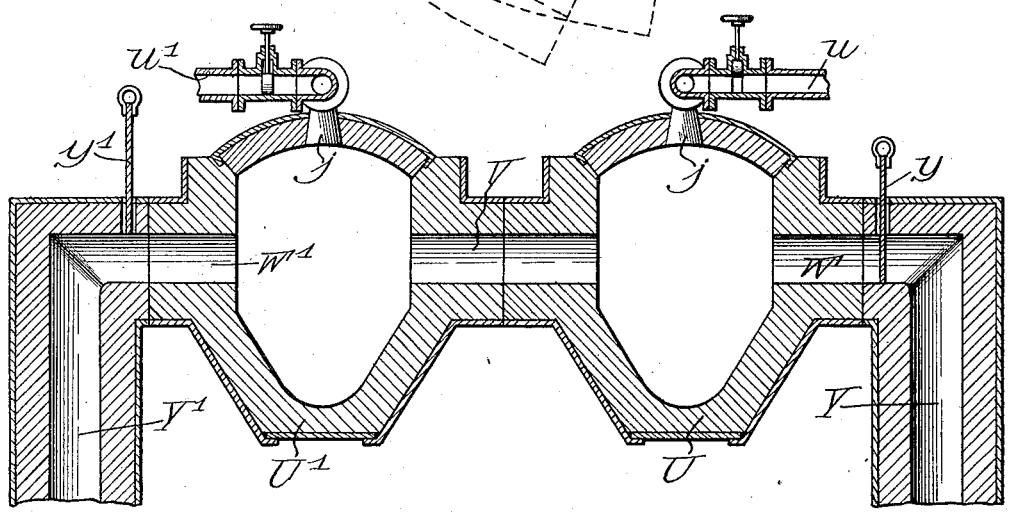

UNITED STATES PATENT OFFICE.

MORRIS SELLERS AND HAL M. NICHOLLS, OF CHICAGO, ILLINOIS.

PROCESS OF BALLING SCRAP.

1,029,235.   Specification of Letters Patent.   Patented June 11, 1912.

Application filed November 8, 1911. Serial No. 659,104.

*To all whom it may concern:*

Be it known that we, MORRIS SELLERS and HAL M. NICHOLLS, citizens of the United States, residing at Chicago, in the county of Cook and State of Illinois, have invented certain new and useful Improvements in the Process of Balling Scrap, of which the following is a specification.

Our invention relates to the method of producing a body of wrought iron from scrap metal; and the invention has for one of its primary objects to provide a method of agglomerating or "balling" the scrap whereby a larger and denser ball can be produced than is obtainable when the methods now commonly known and used are followed.

A further object is to improve the quality of the product and make it possible to obtain a metal which is wholly or very nearly free from impurities and in which the original pieces of scrap are so completely welded together as to lose their identity and form together a substantially homogeneous body of metal.

A further object is to facilitate the process of making commercial wrought iron from scrap by eliminating certain operations heretofore essential to the production of good iron.

A further object is to improve the character of the product by combining with the scrap at a certain stage of the balling process, pure wrought iron with the result that the ball, and particularly the superficial parts of the same are denser, more compact and more nearly homogeneous than is possible by current methods, this feature of our process facilitating the subsequent treatment of the ball, as will be hereinafter described, and improving the character of the resulting product.

A further object is to obtain these advantageous results economically as to fuel used and with a comparatively small loss of metal by oxidation.

The process will be best understood by reference to the drawings herein, which show, somewhat diagrammatically in certain respects, a form of apparatus suitable for carrying out the process, although it should be understood that the process might be practised with other apparatus. The apparatus concerned is not claimed herein, being made the subject matter of our co-pending application Serial No. 620,882, filed April 13, 1911, in which a more detailed illustration and description of it is given.

In the drawings herein Figure 1 is a cross sectional view of a balling furnace, certain parts being shown in elevation; Fig. 2, a longitudinal section taken on line 2—2 of Fig. 1, looking in the direction of the arrows; Fig. 3, a diagram illustrating the character of the movements imparted to the working chamber, and Fig. 4, a cross sectional elevation illustrating a preferred method employing two working chambers connected up so that they can be operated alternately.

Like characters of reference indicate like parts in the several figures of the drawings.

Referring first to Figs. 1 and 2, A designates an oscillating balling or working chamber which is shown as approximately semi-circular in form and provided with the journal B turning in a suitable bearing on the standard C and on the opposite side with a trunnion wheel D which is revolubly supported on the rollers E, E mounted on standard F. The outer portion G of journal B is hollow and is connected by the stuffing box $g$ with the fuel pipe H provided with the controlling valve $h$, pipe H leading from a source of supply of fuel, for example a gas producer or the regenerator customarily used in connection with the gas producer. The hollow portion G of the journal is formed with a branch G' and a pipe I connects the same with a manifold J having two branches or inlets $j$, $j$ extending through the top of the working chamber. The working chamber is formed with a discharge flue K connected with the flue L of the down draft chimney L'. The working chamber A is given oscillatory movements by any suitable form of driving mechanism. For example, the hollow portion G of the journal B may be provided with a worm wheel M meshed by a worm N on a shaft O shown as provided with a pulley P for the belt Q. It will be understood that any mechanism, automatic or otherwise, might be employed for periodically reversing the direction of rotation of shaft O and for varying the length of the oscillations, whenever required, as well as the speed thereof. The openings at each end of the working chamber are closed by doors R of any suitable construction. The brick work at one end of the chamber is preferably hollowed out as indicated at S and a spout S' is provided to facilitate the discharge of molten slag and cinder, as will be hereinafter described. The doors at this end of the furnace are formed with an opening R' through which the slag may find an outlet.

It will be observed that the working chamber A is preferably relatively narrow in proportion to its length, consisting, in fact, of a deep, narrow groove formed on a curve. Preferably the hearth T, provided by the bottom of the chamber, is concave transversely and is formed on curves struck from a center above the axis of oscillation of the chamber. The principal purpose of this is to give the working portion of the hearth, when the furnace is oscillated, a pitch which is greater than that represented by the curvature of the hearth and so insure an initial rolling movement of the charge, before the ball has been formed, and to accomplish this without shortening the travel of the subsequently formed ball. It is possible, though perhaps not mechanically so desirable, to obtain the steep pitch of the hearth, without sacrificing the effective length of the same, by somewhat different arrangements than the one shown. This construction also insures a more rapid travel of the ball and probably heavier impact between the pieces of scrap, thus facilitating the welding together of the mass and the forming of a ball of dense consistency.

Fig. 3 is a diagram illustrating the character of the movement imparted to the working chamber. The hearth T is struck from a center $a$ which is above the center of oscillation $b$. It will be seen that the points in the middle portion of the hearth on which the charge rests move on radii shorter than the hearth radius. Successive positions of the center point $c$ of the hearth are indicated in the drawing by the letter $c'$, $c^2$. It follows that if the charge, as is likely to happen, when first introduced, sticks to the hearth and fails to roll over upon itself so as to initiate the balling operation, the steep pitch produced by the oscillatory movement soon overcomes this reluctance to move; in other words, the force of gravity overcomes friction and the pieces of scrap begin to roll and fall over each other and, under the influence of the heat, to agglomerate and form a ball. Of course, this result could be obtained by shortening the hearth radius, but that is undesirable because it correspondingly shortens the path of travel of the ball at each oscillatory movement.

In carrying out the process by means of the apparatus above described, the scrap, after having been preferably cut or broken up into relatively small pieces, is introduced into the working chamber, the chamber oscillated and gases in a state of combustion introduced into the chamber from the top through the fuel inlets $j$. These fuel inlets preferably oscillate with the chamber and are so flared that the heating blasts therefrom intersect and provide a continuous zone of reducing or welding temperature which extends over the entire path of travel of the charge during the normal operation of the device. The scrap, which collects in the bottom of the chamber, at first is inclined to stick to the hearth, but with a proper relationship existing between the center of oscillation and the hearth center, the pitch produced is sufficient to cause the scrap to roll over upon itself and start the balling operation.

In the rotary balling furnaces which have been heretofore proposed, the hot blast has been introduced axially of the balling chamber. Our process contemplates applying the heat directly upon the metal through the top of the chamber. The gases in a state of combustion are directed immediately down upon the metal. The curvature of the hearth, both longitudinal and transverse, gives a reverberatory action, the chamber being of such a configuration that the flames are reflected against the ball from all sides. After the welding operation is partially performed, the molten slag and cinder may be discharged by tilting the working chamber. The drawing off of the slag and cinder, or a part of it, makes it possible to obtain a better weld between the agglomerated pieces of metal and this facilitates the work of the squeezers and gives in the end a purer and more nearly homogeneous product.

The subjection of the scrap to the intense heat of the furnace removes the impurities, scale, oxids, etc., on the surface of the scrap, which in the form of slag or cinder is caused to flow off through the cinder opening, the remaining charge consisting of substantially pure metal. This discharging of the cinder, therefore, makes it possible to produce a purer and better welded body of metal than would otherwise be the case and, because the presence of cinder tends to prevent the welding together of the particles of the charge into a single mass of caramel-like consistency, that is, prevents the "coming to nature." This early elimination of the cinder hastens the formation of a ball and thus lessens the loss of metal by oxidation, which results from a delayed "coming to nature" and permits of the forming of a denser product.

As an additional, though not in all cases an essential, feature of our process we combine with the scrap, at a proper stage in the balling operation, molten wrought iron which, to get the best results, should be as pure as it is possible to obtain it; and as a result of this, we obtain a ball in which the pieces of scrap, particularly at the outer surface of the ball, are more intimately joined together so that structural homogeniety is approximated. Preferably, and necessarily in order to get the best results if the scrap is not perfectly clean at the start, the molten wrought iron is not brought into contact with the scrap until the impurities, rust, scale, and the like, have been removed. If the surfaces of the scrap which have to be welded together are not clean an imperfect weld is obtained which cannot be cured by adding the pure molten metal. With our furnace constructed in what we consider its preferred form, a ladle of molten metal, for example, the familiar kind of ladle which discharges through the bottom so that the purity of the metal is assured, can be quickly emptied into either end of the working chamber, with a minimum delay or, with proper appliances, possibly without any delay in the oscillation of the chamber. The molten metal, coming in contact with the charge in the furnace, which should not be in a molten condition, is cooled and brought to a caramel state by its contact with the charge in the furnace and immediately unites with the particles of scrap and, by the continued oscillation of the furnace, is worked into the ball until the new iron and the scrap constituting the charge are united into a compact mass. If the furnace is charged with the molten metal at an early stage in the formation of the ball, the ball will be of a very porous character with many interstices between the but partially welded particles of scrap and the molten metal will fill into these interstices and facilitate the forming of a more nearly solid ball. If the molten metal is charged into the furnace after the ball has been formed, although preferably the balling operation will not be carried far enough to produce a solid ball because of the furnace losses entailed by such prolonged operation, the molten metal will fill such interstices as there may be and unite with the exterior of the ball, becoming at first a soft coating which will closely adhere to the ball and which will cool to a firmer consistency and facilitate the formation of the ball into a roughly spherical shape.

The ball when formed may, by tilting the furnace to the proper angle, be delivered by gravity from the furnace at a high temperature which will enable it to be immediately treated in the squeezer thereby further welding the mass together and bringing it to a suitable form for passing through the rolls, whereby it will be formed into a bloom of homogeneous iron at a single heat, that is, the heating which it receives while being formed into a ball in our furnace.

Although we have illustrated our furnace with a cinder discharge opening through which the cinder will not be discharged except when the furnace is given a longer oscillation than it will normally receive during the formation of the ball, still either by shortening the length of the chamber or by a suitable location of the cinder discharge opening, or by sufficiently long oscillations of the furnace, it is practical to make the discharge of the cinder substantially continuous, so that it will be drawn off as fast as formed. Our invention contemplates such a method of treatment. Thus the subsequent treatment of the metal in the squeezers is facilitated and a better grade of iron produced. By following this process it is possible to produce from scrap iron a grade of wrought iron which is at least equal in all respects to the best grade of puddled iron. Furthermore, our process, whether the molten wrought iron be added to the original charge or not, makes it possible, under favorable circumstances at least, to form a bloom directly from the ball without reheating, or treatment other than rolling, subsequent to the usual squeezing operation. In the methods now commonly used the metal after treatment in the squeezers is not sufficiently pure nor are the original pieces of scrap usually united intimately enough so that a ball can be formed directly into a bloom. It has ordinarily to be first formed into muck bars and then reheated and rolled before it becomes commercial iron. Even this treatment does not result in a perfectly clear, pure, homogeneous iron. With a ball of the size that can be turned out in accordance with our process and formed generally according to the directions herein contained, the metal will be sufficiently hot, free from impurities and otherwise in proper condition for forming a bloom without any re-heating.

In Fig. 4 we have illustrated a preferred manner of carrying out our process, having reference particularly to the economy of time and labor and providing for a uniform draw on the fuel supply, the method employing two furnaces of the character shown in the preceding figures so connected that the balling process in the same can be carried on alternately. The two furnaces U, U' are supplied with fuel through the valved fuel pipes $u$, $u'$ preferably connected with a common source of supply of fuel, for example a gas producer or its regenerator. The furnaces are connected by flue V and have discharge flues W, W' communicating with the flues Y, Y' controlled by valves $y$, $y'$. After a charge has been introduced into the furnace U, the fuel supply pipe $u$ is opened to admit fuel into the furnace in question, and the furnace oscillated. The valve in pipe $u'$ is closed at this time and valves $y$, $y'$ set so that the former closes the flue Y while the latter leaves flue Y' open. While the balling operation is going on in chamber U, the previously finished ball is drawn from chamber U' and a fresh charge of metal introduced into this chamber. The waste gases from chamber U pass through connecting flue V into chamber U' where they give an initial heating at a lower temperature to the charge in this chamber and eventually escape through flues W', Y'. Aftering the balling operation in U is completed, the position of the valve controlling pipes u, u' are reversed, the position of valves y, y' reversed, and the furnace U' set in motion. The finished ball can now be withdrawn from the chamber U. By this arrangement a certain initial heating is given to the metal in one chamber during the balling operation in the other chamber, but, what is more important, this method makes it possible for a single operator or a single gang to carry on two balling operations simultaneously which results in a saving of time and labor. Furthermore, this method of operation makes the draw on the fuel supply continuous and uniform, instead of interrupted, which is of particular importance when the fuel is gas generated by a gas producer. It will be understood, however, that any other suitable fuel might be used in practicing the process. It will be understood, however, that our process is not limited to the employment of two furnaces. We have described our process as a process of balling wrought iron scrap. It is possible, however, that low carbon steel might be treated in a similar manner, and the claims should be so understood.

While for convenience we have referred to our process as producing a "ball" it should be understood that any agglomerated mass of iron produced from loose scrap by our process, and either welded into a solid mass or in condition for being welded into a commercially homogeneous mass by passing through compressing mechanism such as a squeezer or rolls, is a "ball" within the meaning and scope of our claims.

It should be understood that in this specification and in the claims the terms are not used with any narrow or restricted sense. It is our purpose and intention to here cover and claim everything both broadly and in detail in the way of the described process which is patentably novel in view of the prior art.

This application includes the subject matter of our application Serial No. 620,883 filed April 6, 1911.

We claim:

1. The process of balling scrap metal which consists in causing a charge of scrap in the presence of a balling temperature to be rolled over a curved surface, whereby the charge will be formed into a ball of desired size and contour, and simultaneously causing said charge to be carried up and pitched down by gravity on a line of travel about a center having a radius shorter than the radius of said surface, whereby the charge is simultaneously formed into a ball and compressed.

2. The process of balling scrap metal which consists in causing a charge of scrap to be oscillated in the presence of a welding temperature upon a surface formed on a curve about a given center, whereby the charge is formed into a ball, and simultaneously causing the charge to alternately rise and descend sharply in a line of travel eccentric to the center about which said balling surface extends, so that the ball is compressed by such sharp descents and elevations.

3. The process of balling scrap metal which consists in rolling a charge of scrap in the presence of a welding temperature upon a surface formed to give a spherical contour to the charge, and simultaneously moving said balling surface about a center eccentric to that about which the balling surface is drawn, whereby the ball is caused to alternately descend and rise upon a sharp inclination, by means of which travel the ball is strongly compressed by its own weight and velocity.

4. The process of balling scrap metal which consists in causing the metal to be rolled back and forth on a curved surface by imparting oscillatory movements to the surface and while subjected to a flame directed down upon the surface from above of sufficient intensity to heat the pieces of scrap to a welding condition without reducing them to molten condition.

5. The process of balling scrap metal which consists in causing the metal to be rolled back and forth on a longitudinally curved transversely concaved surface by imparting oscillatory movements to said surface and while subjected to a flame directed downwardly into the concavity of said surface.

6. The process of balling scrap metal which consists in causing the metal to be rolled upon a surface which is curved in the direction of the path of the ball and transversely concaved and to which rotational movements are given while subjected to a flame directed down upon said metal from above.

7. The process of balling scrap iron which comprises causing the metal, while subjected to heat, to be rolled over a balling surface and during the formation of the ball discharging a portion of the molten impurities, and thereupon adding to the ball decarbonized iron in molten condition.

8. The process of utilizing scrap in the manufacture of wrought iron, which comprises agitating a body of scrap in the presence of a welding temperature, drawing off the resulting cinder and adding molten iron to the charge while the charge is being so agitated in the presence of said temperature.

9. The process of utilizing scrap in the manufacture of wrought iron, which comprises subjecting scrap to a welding temperature, removing more or less of the resulting cinder, combining with the scrap a mass of decarbonized iron, and giving the resulting charge such motion in the presence of said welding temperature as will form the charge into a unitary mass of wrought iron.

10. The process of utilizing scrap in the manufacture of wrought iron, which comprises exposing the scrap to a temperature which will reduce impurities in the scrap to cinder, withdrawing the cinder, adding decarbonized iron, and forming the whole into a unitary mass in the presence of a welding temperature.

11. The process of manufacturing wrought iron, which comprises agitating a charge of scrap in the presence of a welding temperature and in such manner as to tend to form a ball, removing the resulting cinder during such process, adding a charge of molten iron to the partially formed ball, and continuing the agitation of the charge until the scrap and the molten iron are united into a unitary mass.

12. The process of utilizing scrap in the manufacture of wrought iron which comprises agitating scrap in the presence of a welding heat and in such manner that such agitation and the weight of the scrap will automatically form the scrap into a ball, adding molten decarbonized iron to the ball, in the presence of a welding temperature, and continuing the agitation of the ball; whereby the molten iron will automatically become incorporated into the ball under the combined action of the weight and agitation of the ball.

13. The process of utilizing scrap in the manufacture of wrought iron which comprises removing the impurities from the surface of the scrap, then subjecting it to a welding temperature by means of a blast of flame directed against the charge, agitating the charge in the presence of said temperature until the agitation and weight of the charge forms the charge into a mass, then adding pure wrought iron in a molten state to the charge in the presence of said welding temperature and continuing said agitation of the charge until the molten iron combines with the charge to form a ball of wrought iron.

14. The process of utilizing scrap in the manufacture of wrought iron, which comprises agitating scrap, the surfaces of which are free of impurities, in the presence of a welding temperature, until the agitation and weight of the scrap welds the same into a mass, adding pure wrought iron in a molten state to said mass and continuing the agitation of the mass of scrap in the presence of a welding temperature until the entire charge of scrap and molten iron become incorporated into a ball or similar mass of wrought iron.

15. The process of utilizing scrap metal in the manufacture of wrought iron, which comprises subjecting the charge of solid scrap to a balling motion in the presence of a welding heat, adding decarbonized iron in fluid form to said charge of scrap, only after the ball has begun to form, and in the presence of a welding heat, whereby the temperature of the added molten iron is immediately lowered, and then continuing the balling treatment of the combined charge until the molten metal is incorporated with the scrap into a unitary mass of wrought iron.

16. The process of balling scrap iron which comprises causing the metal, while subjected to heat, to be rolled over a balling surface by causing said surface to oscillate, and during the formation of the ball discharging at one extremity of said surface a portion of the molten slag.

17. The process of balling scrap iron which comprises causing the metal, while subjected to heat, to be rolled over a balling surface and after the scrap has assumed the form of a ball, adding thereto decarbonized iron in molten condition.

18. The process of welding wrought iron scrap which comprises forming a loose agglomeration of the same by subjecting it to pressure at a welding heat and after the agglomeration has been made, bringing decarbonized iron in molten condition into contact with the agglomerated scrap so that the interstices are filled therewith.

19. The process of balling iron which comprises heating a charge of scrap to a welding temperature, removing the resultant slag, then adding molten decarbonized iron to the charge, and agitating the entire mass in such manner as to form a ball.

20. The process of balling scrap iron which consists of removing the surface impurities from the pieces of scrap and causing them to adhere together in a mass by the application of heat and pressure, and then adding pure wrought iron in molten form to fill the interstices of said mass.

MORRIS SELLERS.
HAL M. NICHOLLS.

Witnesses as to Morris Sellers:
KATIE MARINGER,
P. H. TRUMAN.

Witnesses as to Hal M. Nicholls:
E. B. NICHOLLS,
EDNA J. REEDER.

Copies of this patent may be obtained for five cents each, by addressing the "Commissioner of Patents, Washington, D. C."